UNITED STATES PATENT OFFICE.

AUGUST DEIDESHEIMER, OF NEUSTADT-ON-THE-HARDT, GERMANY.

PAVING-BLOCK COMPOSITION.

1,062,771.     Specification of Letters Patent.     Patented May 27, 1913.

No Drawing.     Application filed March 17, 1911. Serial No. 615,103.

*To all whom it may concern:*

Be it known that I, AUGUST DEIDESHEIMER, a citizen of the German Empire, residing at Neustadt-on-the-Hardt, Germany, in the county of Palatinate and State of Bavaria, have invented certain new and useful Improvements in Paving-Block Compositions, of which the following is a specification.

My invention relates to a composition for paving-blocks and consists of comminuted natural or artificial stony material, preferably such as basalt, granite, porphyry, lava, syenite, quartz, glass, slag, etc., in admixture with clay.

In accordance with the invention, the stony material is comminuted and the grains of different size separated from each other by sifting so that a number of differently-sized stone materials are obtained, for instance one sort containing grains of 1–6 mm. in diameter; a further sort which is fine enough to pass through the meshes of a sieve having 80 meshes in each square centimeter, which is however retained by a 100 mesh sieve; a third sort having grains finer than the meshes of a 100 mesh sieve and bigger than the meshes of a 300 mesh sieve; and finally a fourth sort containing grains finer than the meshes of a 300 mesh sieve. Besides the different sorts of granular material a mineral dust is prepared, preferably by mixing granular stone material with $\frac{1}{2}$ to $\frac{1}{3}$ of its weight of fire-proof clay and grinding such mixture to a high degree of fineness, so that preferably 20 to 30% of the dust is fine enough to pass through the meshes of a 5,000 mesh sieve. The clay and stone-dust of this mixture react during the burning to yield a silicate bond, without shrinkage of the mass or formation of a porous product. These differently-sized sorts of raw material are mixed with each other in definite proportions, for instance so that, for each 100 parts in weight of the final mixture, 25 to 50 parts of the coarsest material, 15 to 20 parts of the three finer sorts of granular material and 20 to 30 parts of the fine stone-clay dust are taken. The mixture is then moistened within a receptacle with stirring device so that it can be molded into blocks either with a wet mold or with a hydraulic dry mold. The molded blocks are dried if necessary and thereafter burned in suitable kilns till the mass becomes clinkered. The burned blocks are subjected to a slow cooling process in order to avoid their becoming brittle. The size of the blocks is preferably so chosen that their surface which is designed for use has edges of about 24 centimeters and 30 centimeters lengths, whereas the thickness of the blocks is about 6–12 centimeters.

By mixing different sorts of stony material it is possible to obtain paving-blocks of special properties; undesired properties resulting from special raw material which may be at disposal may be overcome by adding to such raw material stony material of different quality.

The paving-blocks manufactured as above described are embedded in mortar and the interstices which preferably are made very tight are filled with thin cement mortar or with asphalt. The pavement thus produced has great durability, does not become slippery and is not liable to the formation of dust and to the penetration of water.

If desired the paving-blocks may, before they are introduced into the kiln and while their surfaces still retain a certain degree of moisture, be provided with a layer of quartz-sand. This may be done either by dipping the blocks into sand, if the blocks are formed with a wet mold, or by directing a sand blast jet against the blocks if formed with a dry hydraulic mold. If the blocks prepared in this way are burned, they obtain an homogeneously colored rough surface, whereas the blocks manufactured without such infusible sand coating are provided with a thin glazing coating, which however disappears in very short time when the blocks are in use.

What I claim is:

A composition for clinkered paving-blocks consisting essentially of a mixture of 70 per cent. and upward of a plurality of sorts of differently-sized granular refractory stony materials, in conjunction with a void-filling and binding mixture of a fluxing dust derived from such stony materials, and fire-clay.

In testimony whereof, I affix my signature in presence of two witnesses.

AUGUST DEIDESHEIMER.

Witnesses:
   HEINRICH THRIP,
   RUDOLF ZUNGFLEISCH.

---

Copies of this patent may be obtained for five cents each, by addressing the "Commissioner of Patents, Washington, D. C."